United States Patent Office 2,802,824
Patented Aug. 13, 1957

2,802,824
O-ARYL PHOSPHINOTHIOATES

Henry Tolkmith and Edgar C. Britton, Midland, Mich., and Clayton F. Holoway, Chicago, Ill., assignors to The Dow Chemical Company, Midland, Mich., a corporation of Delaware No Drawing. Application April 30, 1956,
Serial No. 581,364

4 Claims. (Cl. 260—239)

This invention is concerned with the O-aryl phosphinothioates having the formula

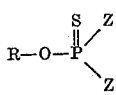

In this and succeeding formulas R represents a halophenyl radical unsubstituted or substituted by a lower alkyl group containing not more than four carbon atoms and each Z represents an aziridinyl or pyrrolidinyl group. These new compounds are viscous liquids somewhat soluble in organic solvents and of very low solubility in water. They have been found to be active as toxic constituents of compositions for the control of bacteria, fungi, mites and insect organisms such as houseflies.

The new compounds may be prepared by reacting ethylene imine or pyrrolidine with a phosphorodichloridothioate of the formula

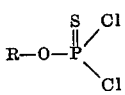

The reaction is carried out in the presence of an inert organic solvent such as benzene, toluene or acetone. The reaction is somewhat exothermic and takes place smoothly in the temperature range of from room temperature to the boiling point of the amine employed with the formation of the desired product and amine hydrochloride of reaction. The temperature may be controlled by regulating the rate of contacting the reactants and by external cooling. Good results are obtained when employing at least four molecular proportions of the amine reagent with each molecular proportion of the phosphorodichloridothioate reagent or at least two molecular proportions of the amine reagent and two molecular proportions of a hydrogen chloride acceptor such as pyridine with each molecular proportion of the phosphorodichloridothioate reagent.

In carrying out the reaction, the phosphorodichloridothioate reagent alone or dispersed in the reaction solvent is added portionwise to the amine reagent or mixture of amine and pyridine dispersed in the reaction solvent. The addition is carried out with stirring and at a temperature of from 5° to 50° C. followed by heating for several hours below the boiling point of the amine to complete the reaction. The reaction mixture is then filtered to remove the amine or pyridine hydrochloride formed, the filtrate is washed with water and the reaction solvent removed by evaporation to obtain the desired product as a residue.

The following examples illustrate the invention but are not to be construed as limiting.

Example 1.—O-(2,4,5-trichlorophenyl) bis(1-pyrrolidinyl) phosphinothioate

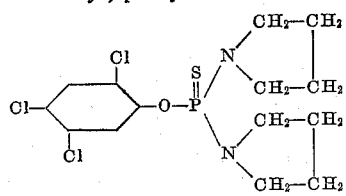

A solution of O-(2,4,5-trichlorophenyl) phosphorodichloridothioate (330.4 grams, 1.0 mole) in one liter of benzene was added portionwise with stirring to a mixture of 142.2 grams (2.0 moles) of pyrrolidine and 174.2 grams (2.2 moles) of pyridine in one liter of benzene. The addition was carried out in two hours and at a temperature of 25° to 51° C. The reaction mixture was then heated at 67–71° C. for 14 hours to complete the reaction. Upon completion of the reaction, the pyridine hydrochloride formed was removed by filtration and the solvent removed by distillation under vacuum. There was obtained an O-(2,4,5-trichlorophenyl) bis(1-pyrrolidinyl) phosphinothioate product as a brown viscous liquid having a density of 1.4087 at 25° C. and a refractive index of 1.5936 at 25° C.

Example 2.—O-(2-bromo-4-tertiarybutylphenyl) bis(1-aziridinyl) phosphinothioate

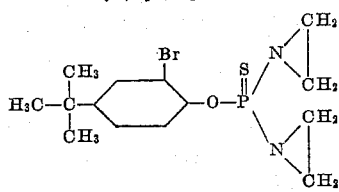

O-(2-bromo-4-tertiarybutylphenyl) phosphorodichloridothioate (72.5 grams, 0.2 mole) was added portionwise with stirring to a solution of 38 grams (0.88 mole) of ethylene imine in 600 milliliters of acetone. The addition was carried out in three hours and at a temperature of 5° to 10° C. After the addition, the mixture was heated at 50° C. for three hours to complete the reaction. Toluene was then added to the reaction mixture and the acetone removed by distillation to precipitate the imine hydrochloride. The solid hydrochloride was filtered off, the filtrate washed with water and the toluene evaporated. There was obtained as a residue an O-(2-bromo-4-tertiarybutylphenyl) bis(1 - aziridinyl) phosphinothioate product as an amber viscous liquid having a nitrogen content of 7.5 percent by analysis as compared to the theoretical value of 7.44 percent.

Example 3.—O-(2,4,5-trichlorophenyl) bis(1-aziridinyl) phosphinothioate

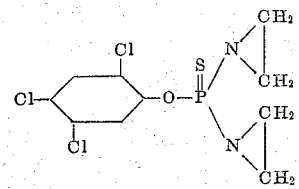

O-(2,4,5-trichlorophenyl) phosphorodichloridothioate (82.5 grams, 0.25 mole) was added portionwise with stirring to a solution of 43 grams (1.0 mole) of ethylene imine in 700 milliliters of toluene. The addition was carried out in two hours and at a temperature of 10° C. After the addition, the mixture was heated at 50° C. for three hours to complete the reaction. The solid imine hydrochloride formed was removed by filtration, the filtrate washed with water and the toluene evaporated.

There was obtained as a residue an O-(2,4,5-trichlorophenyl) bis(1-aziridinyl) phosphinothioate product as a viscous liquid having a nitrogen content of 8.24 percent as compared to the theoretical value of 8.16 percent.

In a similar manner other O-aryl phosphinothioates may be prepared as follows:

O-(3,4-dichlorophenyl) bis(1-pyrrolidinyl) phosphinothioate by the reaction of pyrrolidine and O-(3,4-dichlorophenyl) phosphorodichloridothioate.

O-(2,4-dichlorophenyl) bis(1-aziridinyl) phosphinothioate by the reaction of ethylene imine and O-(2,4-dichlorophenyl) phosphorodichloridothioate.

O-(2-bromo-4-ethylphenyl bis(1-pyrrolidinyl) phosphinothioate by the reaction of pyrrolidine and O-(2-bromo-4-ethylphenyl) phosphorodichloridothioate.

O-(2-chloro-4-propylphenyl) bis(1-aziridinyl) phosphinothioate by the reaction of ethylene imine and O-(2-chloro-4-propylphenyl) phosphorodichloridothioate.

The new O-aryl phosphinothioates are effective as fungicides and parasiticides and are adapted to be employed for the control of such fungi as *Alternaria solani* and many household and agricultural pests. For such use the products may be dispersed on a finely divided carrier and employed as dusts. The new products may also be employed in oils, as constitutents in water emulsions or in water dispersions. In a representative operation 100 percent controls of two-spotted spider mites and house flies have been obtained with aqueous compositions containing three pounds of O-(2,4,5-trichlorophenyl) bis(1-pyrrolidinyl) phosphinothioate per 100 gallons of water.

The O-aryl phosphorodichloridothioates employed as starting materials may be prepared by reacting a molecular excess of phosphorus thiochloride with an alkali metal phenate. Good results are obtained when employing from 2 to 4 moles of phosphorus thiochloride per mole of phenate. The phenate, preferably as the sodium salt, is added portionwise with stirring to the phosphorus thiochloride and the mixture subsequently warmed for a short time to complete the reaction. The crude reaction mixture is then filtered and the filtrate fractionally distilled under reduced pressure to separate the desired product.

We claim:

1. An O-aryl phosphinothioate having the formula

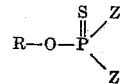

in which R represents a member of the group consisting of halophenyl radicals and halophenyl radicals substituted by a lower alkyl group containing from one to four carbon atoms and each Z represents a member of the group consisting of unsubstituted aziridinyl and unsubstituted pyrrolidinyl radicals.

2. O-(2,4,5-trichlorophenyl) bis(1-pyrrolidinyl) phosphinothioate.

3. O-(2,4,5-trichlorophenyl) bis(1-aziridinyl) phosphinothioate.

4. O-(2-bromo-4-tertiarybutylphenyl) bis(1-aziridinyl) phosphinothioate.

References Cited in the file of this patent
UNITED STATES PATENTS 2,654,738    Lecher et al. _____ Oct. 6, 1953